United States Patent

Takashima

[15] 3,682,563
[45] Aug. 8, 1972

[54] METHOD AND APPARATUS FOR BRINGING A HYDRAULIC TURBINE ALTERNATOR SET ON LOAD

[72] Inventor: Tuneo Takashima, Hitachi, Japan
[73] Assignee: Hitachi, Ltd., Chiyoda-ku, Japan
[22] Filed: Sept. 11, 1970
[21] Appl. No.: 71,477

[30] Foreign Application Priority Data

Sept. 12, 1969 Japan.....................44/72001

[52] U.S. Cl..........................................415/1, 415/13
[51] Int. Cl..............................................F03b 3/06
[58] Field of Search..............................415/13, 1, 16

[56] References Cited

UNITED STATES PATENTS

| | | |
|---|---|---|
| 3,452,962 | 7/1969 | Willi..............................415/1 |
| 3,533,709 | 10/1970 | Willi..............................415/1 |

FOREIGN PATENTS OR APPLICATIONS 120,727   1/1931   Austria.......................415/13

*Primary Examiner*—C. J. Husar
*Attorney*—Craig, Antonelli & Hill

[57] ABSTRACT

During starting a hydraulic turbine alternator set as a generator, opening of the guide vanes of the turbine is controlled by a differential signal corresponding to a difference between the penstock pressure and the spiral casing pressure after the opening of the inlet valve in the penstock.

5 Claims, 2 Drawing Figures

INVENTOR
TUNEO TAKASHIMA
BY
Craig, Antonelli, Stewart & Hill
ATTORNEYS

METHOD AND APPARATUS FOR BRINGING A HYDRAULIC TURBINE ALTERNATOR SET ON LOAD

BACKGROUND OF THE INVENTION

The present invention relates to a controlling method and an apparatus therefor for bringing a hydraulic turbine alternator set on load.

In order to start for power generation operating a hydraulic reaction turbine or reversible pump turbine (hereinafter called a hydraulic turbine) which stands still with its inlet valve in the penstock closed, it is conventional that first the inlet valve is fully opened, then guide vanes of the turbine are gradually opened to deliver a rotating torque to the runner of the hydraulic turbine, and thus the hydraulic turbine and an alternator connected thereto are started.

In some circumstances, it is required to maintain the hydraulic turbine alternator set rotating, with the alternator synchronized with other generating units but without delivering any electrical energy. Such operating may be called rotary condenser operation and may be required alternatively to enable the hydraulic turbine generator set to start delivering electrical power at very short notice in the event of the other alternators in the electrical power delivery network experiencing a sudden load. In other circumstances, it is also required to preparatorily maintain the hydraulic turbine-alternator set rotating with its inlet valve closed for the purpose that the set may be able to start delivering electrical power in the shortest possible time.

For bringing the hydraulic turbine generator set on load in these instances, heretofore, the guide vanes of the turbine have been made to begin to open after the completion of opening of the inlet valve in the penstock. Although an apparatus or a method for this starting operation is simple, it has a fatal drawback in that considerable time necessary to completely open the inlet valve is wasted or delayed before the hydraulic turbine set is brought on load.

Another method has been proposed in which guide vanes are caused to begin to open with the opening degree of the inlet valve reaches one-third or a half of its fully opened degree. Even in this method, however, time necessary for the inlet valve to reach the predetermined degree is wasted.

Another concept has been proposed wherein, in order to allow the guide vanes to begin to open in advance of complete opening of the inlet valve, switching link means are employed between the inlet valve and the guide vanes to maintain that the equivalent opening area of the inlet valve is at all the time at least twice that of the guide vanes. Although this improvement may reduce preparatory time for bringing the hydraulic turbine alternator set on load, switching link means are complicated and difficult to manufacture and adjust.

SUMMARY OF THE INVENTION

An object of the present invention is to provide a method for bringing a hydraulic turbine alternator set on load, which greatly reduces preparatory time and is simple in control and adjustment.

Another object is to provide a simple apparatus for the above-mentioned method which is easy to manufacture and handle.

According to the present invention, in order to bring on load a hydraulic turbine set which either stands still or rotates as a rotary condensor with its inlet valve and guide vanes closed, means is provided responsive to variations in the pressure in the spiral casing and after the inlet valve is made to begin to open the guide vanes are successively made to open when the pressure downstream of the inlet valve or in the turbine casing reaches a predetermined value, preferably increases substantially equal to that in the penstock. In case the pressure in the turbing casing drops below a predetermined value after opening of the guide vanes, the guide vanes are made to stop opening or are made to begin to close by a small amount so as to maintain the pressure in the turbine casing substantially at a predetermined value.

According to the present invention the pressure in the turbine casing is maintained at a predetermined value and the turbine alternator set is brought on load in a possible shortest time without any disturbance such as water hammering or water head separation in the water flow by a simple control means. A predetermined value in the turbine casing at which the guide vanes begin to open is in most cases chosen substantially equal to the corresponding pressure in the penstock but is determined according to such factors as structure of the inlet valve, structure of the hydraulic turbine, and the manner or speed of the opening of the inlet valve. The pressure in the hydraulic turbine casing may be detected either directly from the turbine casing or from difference in pressure between upstream and downstream of the inlet valve in the penstock.

DETAILED DESCRIPTION OF THE DRAWING

Figure 1:
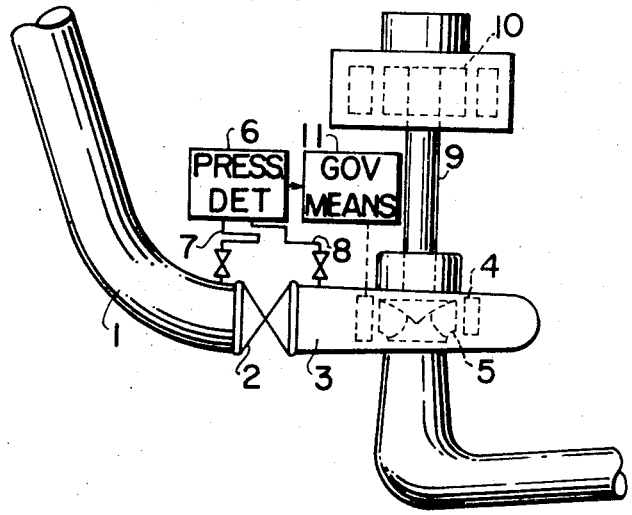
FIG. 1 is a schematic diagram of a hydraulic turbine alternator set having control means according to the present invention.
Figure 2:
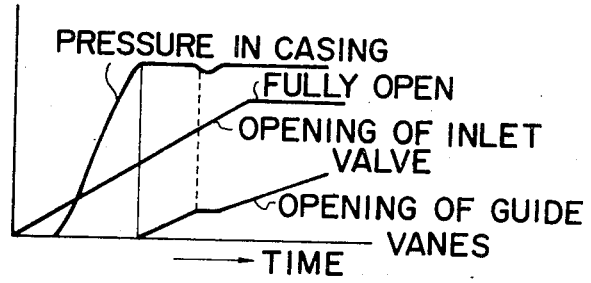
FIG. 2 is a operation diagram plotted against time showing relations among opening degrees of the inlet valve, opening degrees of the guide vanes, and the pressure in the turbine casing.

Referring now to the drawing and, in particular, to FIG. 1, a penstock 1 is connected with a hydraulic turbine casing 3 through an inlet valve 2. Guide vanes 4 are provided around the runner 5 of the hydraulic turbine and its opening is adjusted by a governor means 11. A pressure detector 6 is provided to detect a difference in pressure between conduits 7, 8 connected with the upstream and downstream portions of the inlet valve, respectively. An alternator 10 is connected with the runner 5 of the hydraulic turbine through a main shaft 9. The pressure detector 6 is operatively connected with the governor means 11 to give control signals.

For starting or bringing on load the hydraulic turbine alternator set which may either stand still or be rotated as a rotary condensor with the alternator synchronized with other generating units but without delivering any electrical power and in which the inlet valve and guide vanes are closed, first the inlet valve 2 is made to open, usually at a constant speed, by suitable governor means (not shown), and irrespectively of the opening degree of the inlet valve, the governor means 11 begins to open the guide vanes 4 when the pressure detector 6 detects that the pressure in the turbine casing rises to a value substantially equal to that in the penstock 1.

In case the pressure in the turbine casing drops due to the opening of the guide vanes, the pressure detector 6 resets and no signal is transmitted to the governor means 11 and opening of the guide vanes is interrupted. This interruption is necessary to prevent mechanical damage of the casing due to abrupt drop in the pressure in the casing which may cause water head separation or water hammering. Upon interruption of the opening of the guide vanes, the pressure in the casing again begins to increase and the pressure detector 6 again operates and the guide vanes resume opening.

During the period the inlet valve begins to open and reaches its complete opening, the opening degree of the guide vanes is so adjusted by the pressure detector 6 that the water pressure in the turbine casing may not drop greatly below that in the penstock, and the alternator 10 may be brought on load in the shortest possible time. As a pressure detector 6, any conventional pressure sensor such as piston-type or diaphragm-type may be employed and it will be easily coupled with the governor means 11 which is also conventional in the art.

While I have shown and described an embodiment in accordance with the present invention, it is to be clearly understood that the same is susceptible of numerous changes and modifications as will be apparent to one skilled in the art, and I, therefore, do not wish to be limited to the details shown and described herein but intend to cover all such changes and modifications as are encompassed by the scope of the present invention.

What is claimed is:

1. A method for bringing on load a hydraulic turbine alternator set having inlet valve means and guide vane means, which hydraulic turbine alternator set stands still or is rotated at synchronous speed as a rotary condensor with the inlet valve means and guide vane means closed, comprising:
   first opening the inlet valve means, and then beginning
   to open the guide vane means when the water pressure downstream of the inlet valve means reaches a predetermined value.

2. An apparatus for bringing on load a hydraulic turbine alternator set having inlet valve means and guide vane means, which hydraulic turbine alternator set stands still or is rotated with the inlet valve means and the guide vane means closed, comprising
   means responsive at least to the pressure downstream of the inlet valve means, and
   means operatively connected with the pressure responsive means and the guide vane means for beginning to open the guide vane means when the pressure downstream of the inlet valve means reaches a predetermined value.

3. An apparatus according to claim 2, wherein the pressure responsive means are responsive to a difference in pressure between upstream of the inlet valve means and downstream of the inlet valve means.

4. An apparatus according to claim 2, wherein the means for beginning to open the guide vane means are adapted to stop opening of the guide vane means when the pressure downstream of the inlet valve means drops below a predetermined value.

5. An apparatus according to claim 3, wherein the means for beginning to open the guide vane means are adapted to stop opening of the guide vane means whtn the difference in pressure increases beyond a predetermined value.

* * * * *